United States Patent
Harsha et al.

(10) Patent No.: US 11,477,805 B2
(45) Date of Patent: Oct. 18, 2022

(54) CHANNEL PLAN DETERMINATION

(71) Applicant: Hewlett Packard Enterprise Development LP, Houston, TX (US)

(72) Inventors: Sree Harsha, Santa Clara, CA (US); Dongwoon Hahn, Santa Clara, CA (US); Sachin Ganu, Santa Clara, CA (US); Mathieu Mercier, St. Laurent (CA); Nethra Muniyappa, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 127 days.

(21) Appl. No.: 16/933,740

(22) Filed: Jul. 20, 2020

(65) Prior Publication Data
US 2020/0351907 A1 Nov. 5, 2020

Related U.S. Application Data

(63) Continuation of application No. 15/700,163, filed on Sep. 10, 2017, now Pat. No. 10,721,752.

(51) Int. Cl.
| | |
|---|---|
| *H04W 24/00* | (2009.01) |
| *H04W 72/12* | (2009.01) |
| *H04W 72/04* | (2009.01) |
| *H04W 28/02* | (2009.01) |
| *H04W 16/10* | (2009.01) |

(Continued)

(52) U.S. Cl.
CPC ....... *H04W 72/1231* (2013.01); *H04W 16/10* (2013.01); *H04W 28/0231* (2013.01); *H04W 72/0453* (2013.01); *H04W 72/082* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 7,512,379 B2 | 3/2009 | Nguyen et al. | |
| 7,573,857 B1 | 8/2009 | Radhakrishnan et al. | |

(Continued)

OTHER PUBLICATIONS

European Search Report and Search Opinion Received for EP Application No. 17198978.3, dated May 4, 2018, 10 pages.

(Continued)

*Primary Examiner* — Sithu Ko
(74) *Attorney, Agent, or Firm* — Brooks, Cameron & Huebsch, PLLC

(57) ABSTRACT

A network controller may include a memory and a processor. The memory may include instructions executable by the processor to receive a message from an access point. The message may comprise an interference event detected on a particular channel, wherein the particular channel is part of a particular channel list associated with the access point and stored at the network controller in a wireless local area network (WLAN). The memory may further include instructions executable to remove the particular channel from the particular channel list associated with the access point. The memory may further include instructions executable to determine a channel plan for a plurality of access points in the WLAN based on a corresponding plurality of channel lists including the particular channel list and deploy the channel plan to the plurality of access points.

17 Claims, 4 Drawing Sheets

(51) Int. Cl.
   *H04W 72/08* (2009.01)
   *H04W 84/12* (2009.01)

(56) References Cited

U.S. PATENT DOCUMENTS

| | | | |
|---|---|---|---|
| 8,150,955 B2 | 4/2012 | Busch et al. | |
| 8,576,817 B2 | 11/2013 | Stanforth et al. | |
| 9,622,089 B1 | 4/2017 | Ngo et al. | |
| 9,743,418 B1 | 8/2017 | Jupudi et al. | |
| 2004/0151137 A1* | 8/2004 | McFarland | H04W 72/02 370/341 |
| 2005/0153667 A1 | 7/2005 | Cave et al. | |
| 2010/0238871 A1* | 9/2010 | Tosic | H04W 16/10 370/329 |
| 2011/0286352 A1* | 11/2011 | Kruys | H04L 27/2647 370/252 |
| 2013/0035128 A1* | 2/2013 | Chan | H04W 72/085 455/513 |
| 2013/0183989 A1 | 7/2013 | Hasegawa et al. | |
| 2013/0201863 A1 | 8/2013 | Chan et al. | |
| 2014/0050156 A1 | 2/2014 | Chan et al. | |
| 2014/0301328 A1 | 10/2014 | Yacovitch | |
| 2014/0307587 A1 | 10/2014 | Fayssal | |
| 2015/0215950 A1 | 7/2015 | Amini et al. | |
| 2015/0223249 A1 | 8/2015 | Ganu et al. | |
| 2016/0037542 A1* | 2/2016 | Tang | H04W 16/10 370/329 |
| 2016/0066202 A1 | 3/2016 | Dayanandan et al. | |
| 2016/0112969 A1 | 4/2016 | Zhou et al. | |
| 2016/0345188 A1 | 11/2016 | Chen et al. | |
| 2017/0026845 A1* | 1/2017 | Garg | H04W 16/10 |
| 2017/0094651 A1 | 3/2017 | Green et al. | |
| 2017/0156149 A1 | 6/2017 | Lin et al. | |
| 2018/0139615 A1* | 5/2018 | Cui | H04W 72/0453 |
| 2018/0359730 A1* | 12/2018 | Jung | H04K 3/822 |

OTHER PUBLICATIONS

Pineoro, M.M. et al., Infrared communication channel optimisation for quasi-diffuse multi-spot wireless indoor networking, (Research Paper), 2002, 4 Pgs.

Proxim Wireless Corp., Tsunami (Registered) 8000 Series (Point-to-point and Point-to-multipoint Products), Software Management Guide, Aug. 2013, 235 Pages.

* cited by examiner

CHANNEL PLAN DETERMINATION

BACKGROUND

A network may include a plurality of access points. The access points may be divided within the network into partitions. Each partition may have a channel plan to govern the channels on which each of the plurality of access points operate.

DETAILED DESCRIPTION

Figure 1:
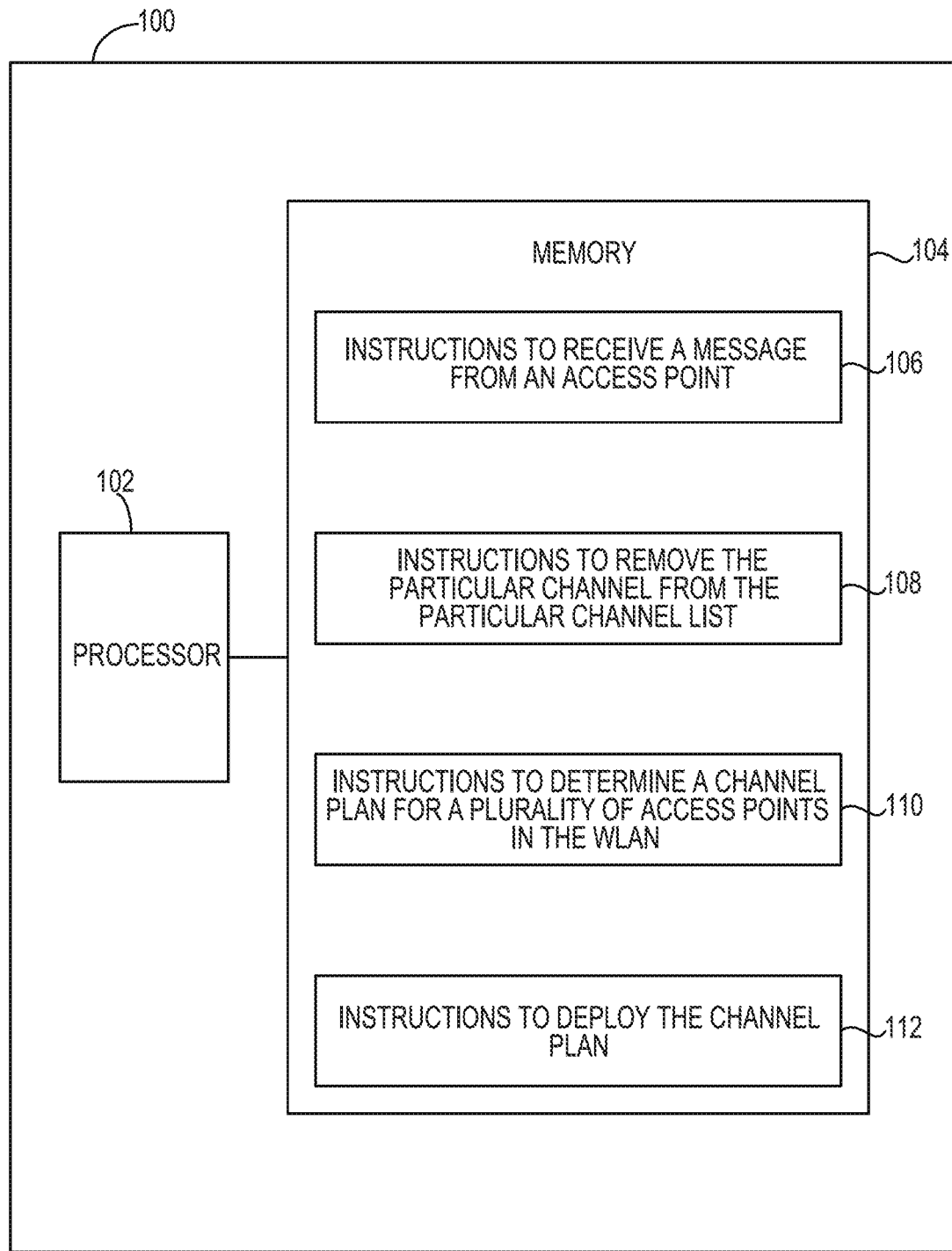
FIG. 1 is an example network controller for channel plan determination consistent with the present disclosure.

Access points may be used to provide devices access to a network. As used herein, an access point can refer to a networking device that allows a client device to connect to a wired or wireless network. As used herein, the term "access point" (AP) can, for example, refer to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communication standards. An AP can include a processing resource, memory, and/or input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces. An AP can include a memory resource, including read-write memory, and a hierarchy of persistent memory such as ROM, EPROM, and Flash memory. The network may be a wireless network, for example, a Wireless Local Area Network (WLAN). As used herein, the term "wireless local area network" (WLAN) can, for example, refer to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

In some examples, access points within a WLAN may be divided into a plurality of partitions. As used herein, a partition refers to a division of a system, such as a wireless network, into smaller subsystems. Each partition in a system may operate independently of the other partitions. This may include having a separate controller, operating system, and the like. As used herein, a controller refers to an interface between two devices. In some examples, a controller may be an interface between a peripheral device and a computing system, although examples are not so limited. A controller may further manage a connection between a device, such as an access point, and a network.

Within a network, each partition may have a channel plan. As used herein, a channel plan refers to a disposition of access points among various operating channels. Each access point within a network may have the capability to operate on one or several channels, called feasible channels. A channel plan may therefore assign each of the access points to a particular operating channel. The channel plan may, for example, look at overlap between the feasible channels between two or more access points and assign the two or more access points to operate on different feasible channels such that the channel plan does not include channel overlap within the partition.

During operation, an access point may experience interference. As used herein, interference refers to any undesired energy within a system that interferes with reception and/or emission of signals. Interference may take the form of noise or radar. As used herein, noise refers to interference that is able to occur on any channel and/or frequency. In some examples, noise may occur in response to an amount of traffic occurring on a channel. For example, noise may occur in response to a large amount of activity from client devices on a particular access point or particular channel. Radar refers to interference that may occur on a particular frequency, for example, 5 Gigahertz (GHz). Radar events may occur when the access point is operating on a basic service set (BSS) channel.

When an access point experiences an interference event, the access point may transmit a message to a controller. The message may indicate that the access point experienced interference, the type of interference experienced, the channel on which the access point experienced the interference, and/or the time at which the interference occurred, although examples are not so limited. The controller may log the interference event. The controller may further move the access point to a new operating channel in response to receiving the message than an interference event occurred. In some examples, the access point may be moved to the new operating channel for a predetermined period of time, such as thirty minutes, although examples are not so limited. Once the predetermined period of time has elapsed, the access point may be moved back to its original operating channel. Thus, while the interference event may be logged at the controller and the access point may be temporarily moved from the operating channel that caused the access point, the access point may return to operating on the channel on which the interference event occurred. Moreover, when a new channel plan is computed for the network and/or partition, the channel plan may fail to account for the channel or channels that experienced interference events.

By contrast, channel plan determination according to the present disclosure may utilize the log of interference events when computing a new channel plan for a network and/or partition. A controller may access the log of interference events occurring on an access point or a plurality of access points on the network. The controller may then determine the channel or channels on which interference occurred and filter a feasible channel list by removing the interference-prone channel or channels. The controller may then compute a new channel plan for the network and/or partition. In some examples, the new channel plan may include channels that were not removed from the feasible channel list during filtering.

FIG. 1 is an example network controller 100 for channel plan determination consistent with the present disclosure. As used herein, a network controller refers to a management device on a computer network. A network controller may, for example, manage access points within a wireless local area network (WLAN). Network controller 100 may include processor 102. Network controller 100 may further include a memory 104 on which may be stored instructions, such as instructions 106, 108, 110, and 112. Although the following descriptions refer to a single processor and a single memory, the descriptions may also apply to a system with multiple processors and multiple memories. In such examples, the instructions may be distributed (e.g., stored) across multiple memories and the instructions may be distributed (e.g., executed by) across multiple processors.

Processor 102 may be a central processing unit (CPU), a semiconductor based microprocessor, and/or other hardware devices suitable for retrieval and execution of instructions stored in non-transitory computer readable medium 104. Processor 102 may fetch, decode, and execute instructions 106, 108, 110, 112, or a combination thereof. As an alternative or in addition to retrieving and executing instructions, processor 102 may include at least one electronic circuit that includes electronic components for performing the functionality of instructions 106, 108, 110, 112 or a combination thereof.

Memory 104 may be electronic, magnetic, optical, or other physical storage device that stores executable instructions. Thus memory 104 may be, for example, Random Access Memory (RAM), an Electrically-Erasable Programmable Read-Only Memory (EEPROM), a storage drive, an optical disc, and the like. Memory 104 may be disposed within network controller 100, as shown in FIG. 1. In this example, the executable instructions may be "installed" on the network controller. Additionally and/or alternatively, memory 104 may be a portable, external or remote storage medium, for example, that allows network controller 100 to download the instructions from the portable/external/remote storage medium. In this situation, the executable instructions may be part of an "installation package". As described herein, memory 104 may be encoded with executable instructions for channel plan determination.

Instructions 106 may include instructions executable by the processor 102 to receive a message from an access point. The message may comprise an indication that the access point experienced an interference event detected on a particular channel. The interference event may be at least one of a noise event and a radar event. In some examples, the particular channel may be the channel on which the access point is operating at the time it experiences the interference event. The particular channel may be part of a particular channel list, wherein the particular channel list may comprise a list of channels upon which a corresponding access point is able to operate. In some examples, the particular channel list may be stored at the network controller 100. The network controller 100 may be part of a WLAN.

Instructions 108 may include instructions executable by the processor 102 to remove the particular channel from the particular channel list associated with the access point. In some examples, the particular channel may be removed in response to the receipt of a message at 106 that the access point experienced an interference event on the particular channel. Removing the particular channel from the particular channel list at 108 may include marking the particular channel as unavailable. That is, removing the particular channel at 108 may include marking the channel as a non-feasible channel on the particular channel list, wherein marking the channel includes noting that the particular channel experienced at least one interference event.

Instructions 110 may include instructions executable by the processor 102 to determine a channel plans for a plurality of access points in the WLAN. In some examples, the plurality of access points in the WLAN may be part of a single partition. The channel plan may be determined based for the plurality of access points based on a corresponding plurality of channel lists including the particular channel list. That is, the channel plan may be determined based on a plurality of channel lists, with each channel list corresponding to an access points. In some examples, determining a channel plan at 110 may include determining a channel plan that excludes the removed particular channel. Said differently, determining a channel plan at 110 may include determining a channel plan that does not include the channel that experienced an interference event and was marked as non-feasible.

The channel plan determined by instructions 110 may be based on the information gathered by network controller 100 from the plurality of access points in the WLAN. That is, network controller 100 may gather information from the plurality of access points in the WLAN and, based on the gathered information, execute instructions 110 to determine a channel plan. In some examples, instructions 110 may further consult additional information regarding the WLAN in determining the channel plan. The additional information may be stored at network controller 100. Said differently, instructions 110, when executed by a processor such as processor 102, may use information stored in the network device 100, as well as information gathered from the plurality of access points in the WLAN, to determine a channel plan for the plurality of access points.

Instructions 112 may include instructions executable by the processor 102 to deploy the channel plan to the plurality of access points. As used herein, to deploy a channel plan means to transmit the channel plan from the network controller to the access points. In some examples, the transmitted channel plan may correspond to the channel plan determined by instructions 110.

Instructions 112 may further include instructions executable to determine a number of access points of the plurality of access points to experience an interference event. In some examples, instructions 112 may include instructions executable to access the logs of the network controller 100. As described previously, network controller 100 may include a log of messages received, such as the message received at 106, including an indication that the transmitting access point experienced an interference event. Instructions 112 may include instructions executable to access the messages within the log and determine a number of access points of the plurality of access points to have transmitted a message. That is, instructions 112 may include instructions executable to determine a number of access points of the plurality of access points to have experienced an interference event based on the content of the log stored at network controller 100.

Instructions 112 may further include instructions executable to deploy the channel plan to the plurality of access points based on the number of access points of the plurality of access points being above a threshold number of access points. That is, instructions 112 may include instructions executable to deploy the channel plan to the plurality of access points when the number of access points to have experienced an interference event is above a threshold number of access points. The threshold number may be a percentage of the total number of access points, such as 25%, or may be an integer number, such as 15, although examples are not so limited.

When the number of access points of the plurality of access points is below the threshold number of access points, instructions 112 may include instructions executable to refrain from deploying the channel plan to the plurality of access points. Said differently, the channel plan may not be deployed by instructions 112 when the number of access points to have experienced an interference event is below a threshold number of access points. However, when instructions 112 refrain from deploying the channel plan to the plurality of access points, network controller 100 may continue to monitor the network and receive messages comprising information about interference events.

Figure 2:
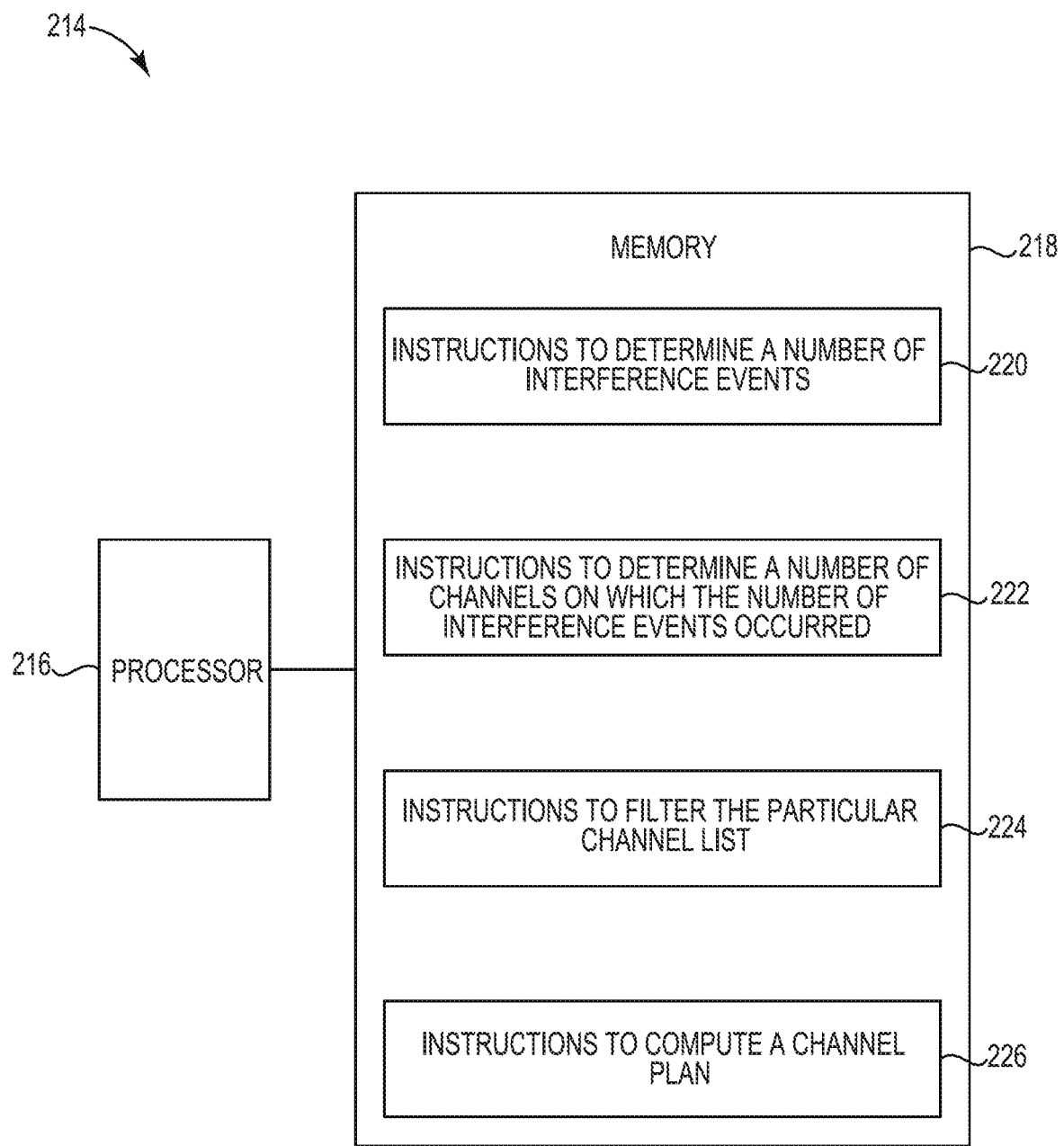
FIG. 2 is an example system for channel plan determination consistent with the present disclosure.

FIG. 2 is an example system 214 for channel path determination consistent with the present disclosure. System 214 may include a processor 216. Processor 216 may be a central processing unit (CPU), a semiconductor based microprocessor, and/or other hardware devices suitable for retrieval and execution of instructions stored in memory 218. Processor 216 may fetch, decode, and execute instructions 220, 222, 224, 226, or a combination thereof. As an alternative or in addition to retrieving and executing instructions, processor 214 may include at least one electronic circuit that includes electronic components for performing the functionality of instructions 220, 222, 224, 226 or a combination thereof.

Memory 218 may be electronic, magnetic, optical, or other physical storage device that stores executable instructions. Thus memory 218 may be, for example, Random Access Memory (RAM), an Electrically-Erasable Programmable Read-Only Memory (EEPROM), a storage drive, an optical disc, and the like. Memory 218 may be disposed within system 214, as shown in FIG. 2. In this example, the executable instructions may be "installed" on the network controller. Additionally and/or alternatively, memory 218 may be a portable, external or remote storage medium, for example, that allows system 214 to download the instructions from the portable/external/remote storage medium. In this situation, the executable instructions may be part of an "installation package". As described herein, memory 218 may be encoded with executable instructions for channel plan determination.

Instructions 220 may include instructions executable by processor 216 to determine a number of interference events. In some examples, instructions 220 may include instructions executable to determine a number of interference events having occurred on a particular access point of a plurality of access points. In some examples, the plurality of access points may be part of a WLAN. The number of interference events having occurred on a particular access point may be determined during a period of time. That is, the number of interference events determined by instructions 220 may be the number of interference events to have occurred over a particular period of time. For example, the number of interference events having occurred on a particular access point may be determined across a 24 hour time period, although examples are not so limited.

In some examples, instructions 220 may further include instructions executable by processor 216 to retrieve a log of interference events. The log may be stored on a network controller, such as network controller 100, described with respect to FIG. 1. An access point, such as the particular access point, may transmit a message to the network controller. The message may correspond to an interference event; that is, the message may include an indication that the particular access point experienced an interference event. Upon receipt, the message, and thus the occurrence of the interference event, may be logged. Instructions 220 may include instructions to determine a number of messages logged during the particular time period.

Instructions 222 may include instructions executable by the processor 216 to determine a number of channels on which the number of interference events occurred. In some examples, the number of channels may be part of a particular channel list. That is, the number of channels may be on a list of feasible channels associated with the particular access point. In some examples, the particular channel list may be stored on a network controller, such as network controller 100 (shown in FIG. 1).

Instructions 224 may include instructions executable by the processor 216 to filter the particular channel list. In some examples, the particular channel list may be filtered based on the number of channels determined to have the number of interference events. That is, instructions 224 may include instructions executable to filter the particular channel list based on the channels determined to have had interference events, as determined by instructions 222. In some examples, instructions 224 may include instructions executable to remove the number of channels from the particular channel list. Said differently, instructions 224 may include instructions to filter the particular channel list by removing the number of channels to have experienced interference from the particular channel list.

Instructions 226 may include instructions executable by the processor 216 to compute a channel plan for the plurality of access points in the WLAN. In some examples, the channel plan may be computed based on the filtered channel list. That is, instructions 226 may include instructions to compute a channel plan based on the particular channel list filtered by instructions 224. In some examples, instructions 226 may include instructions executable to determine an available channel for each of the plurality of access points in the WLAN. Said differently, instructions 226 may include instructions executable to determine a feasible channel for each of the plurality of access points based on the filtered channel list. Instructions 226 may further include instructions executable to assign each of the plurality of access points in the WLAN to a corresponding available channel. That is, instructions 226 may include instructions executable to assign each access point to a particular channel, where the particular channel is an available channel for the access point.

Figure 3:
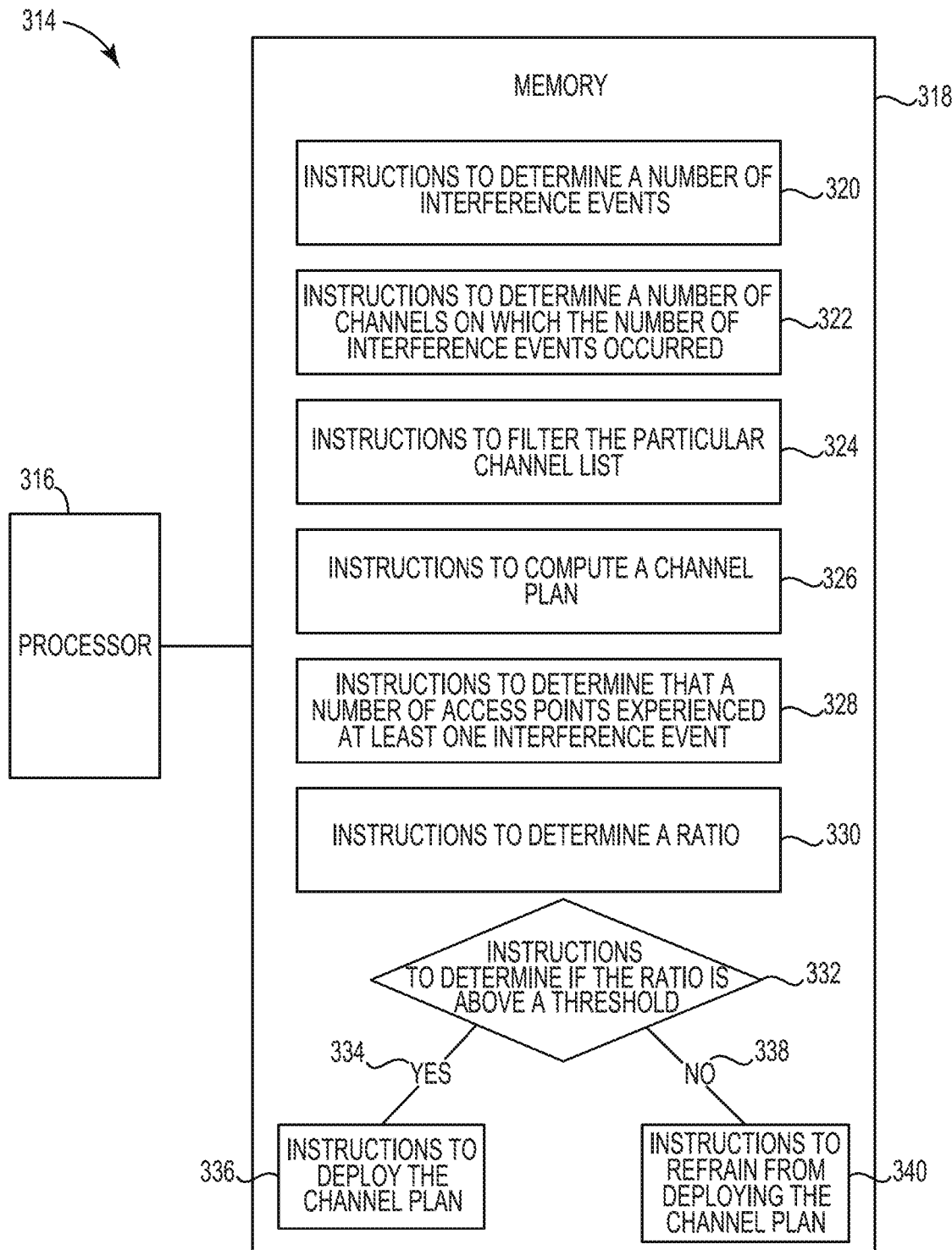
FIG. 3 is another example system for channel plan determination consistent with the present disclosure.

FIG. 3 is another example system 314 for channel plan determination consistent with the present disclosure. System 314 may include a processor 316. Processor 316 may be akin to processor 216, described with respect to FIG. 2. System 314 may further include a memory 318. Memory 318 may be akin to memory 218 previously described with respect to FIG. 2. As shown in FIG. 3, memory 318 may include instructions executable for channel plan determination.

Instructions 320 may include instructions executable by processor 316 to determine a number of interference events. Instructions 320 may be akin to instructions 220, described with respect to FIG. 2. As described previously, instructions 320 may include instructions executable to determine a number of interference events having occurred on a particular access point of a plurality of access points. Moreover, the number of interference events determined by instructions 320 may be the number of interference events to have occurred over a particular period of time.

Instructions 322 may include instructions executable by processor 16 to determine a number of channels on which the interference events occurred. Instructions 322 may be akin to instructions 222 discussed with respect to FIG. 2. In some examples, the number of channels determined by instructions 322 may be part of a particular channel list. Said differently, the number of channels may be on a list of feasible channels associated with the particular access point. In some examples, the particular channel list may be stored on a network controller, such as network controller 100 (shown in FIG. 1).

Instructions 324 may include instructions executable by processor 316 to filter the particular channel list. Instructions 324 may be akin to instructions 224, described with respect to FIG. 2. As previously described, the particular channel list may be filtered by removing or marking as unavailable those channels on which interference was determined to have occurred by instructions 322.

Instructions 326 may include instructions executable by processor 316 to compute a channel plan. Instructions 326 may be akin to instructions 226 described with respect to FIG. 2. As described previously, the channel plan may be computed based on the filtered channel list determined by instructions 324. Instructions 326 may further include instructions executable to determine an available channel for each of the plurality of access points in the WLAN. That is, instructions 326 may include instructions executable to determine a feasible channel for each of the plurality of access points based on the filtered channel list. Instructions 326 may further include instructions executable to compute a channel plan by assigning each of the plurality of access points in the WLAN to a corresponding available channel.

Instructions 328 may include instructions executable by the processor 316 to determine that a number of access points of the plurality of access points experienced at least one interference event. In some examples, instructions 328 may determine that the number of access points experienced at least one interference event during a particular time. To determine the number of access points of the plurality of access points having experienced at least one interference event, instructions 328 may include instructions to access the log of messages transmitted by the access points when an interference event occurs. As described with respect to FIG. 1, the log may be stored on a network controller, such as network controller 100.

Instructions 330 may include instructions executable by the processor 316 to determine a ratio of access points which experienced at least one interference event to access points which did not experience at least one interference event. In some examples, the number of access points to not have experienced at least one interference event may be determined by subtracting the number of access points which experienced at least one interference event, as determined by instructions 328, from a total number of access points. The total number of access points may be the total number of access points in the WLAN, or a total number of access points within a partition of the WLAN.

The ratio determined by instructions 330 may indicate, for example, a percentage or a proportion of access points to have experienced at least one interference event. A greater number of access points experiencing at least one interference event may correspond to a higher value for the ratio.

Instructions 332 may include instructions executable by processor 316 to determine whether the ratio of the number of access points to have experienced at least one interference event to the number of access points to not have experienced an interference event is above a threshold ratio. That is, instructions 332 may include instructions executable to determine whether the ratio determined by instructions 330 is above a threshold value. If the ratio determined by instructions 330 is determined to be greater than the threshold ratio ("yes" 334), instructions 336 may cause the processor to deploy the channel plan to the plurality of access points. In some examples, the channel plan to be deployed may be the channel plan computed by instructions 326.

In some examples, instructions 336 may include instructions to filter a channel list for each of the plurality of access points that experienced at least one interference event. As previously described, the channel list may be filtered by, for example, removing the channels on which interference events were experience, or by marking those channels as unavailable. Thus, each access point of the plurality of access points may have a corresponding filtered channel list. Instructions 336 may further include instructions executable by processor 316 to compute the channel plan for the plurality of access points. In some examples, the channel plan may be computed based on the plurality of filtered channel lists. That is, the filtered channel lists for each of the plurality of access points may be used to compute a channel plan for the plurality of access points.

If, however, the ratio of the number of access points to experience at least one interference event to the number of access points to not experience an interference event is not above the threshold ratio ("no" 338), instructions 340 may be executable by processor 316 to refrain from deploying the computed channel plan to the plurality of access points. That is, if the ratio of the number of access points which experienced an interference event to the number of access points which did not is below the threshold value, the channel plan computed by instructions 326 may not be deployed to the plurality of access points. In some examples, if the computed channel plan is not deployed to the plurality of access points by instructions 340, each of the plurality of access points may remain on a current operating channel. That is, if the ratio determined by instructions 330 is determined not to be above a threshold ratio at 338, the access points may continue to use a preexisting channel plan.

Figure 4:
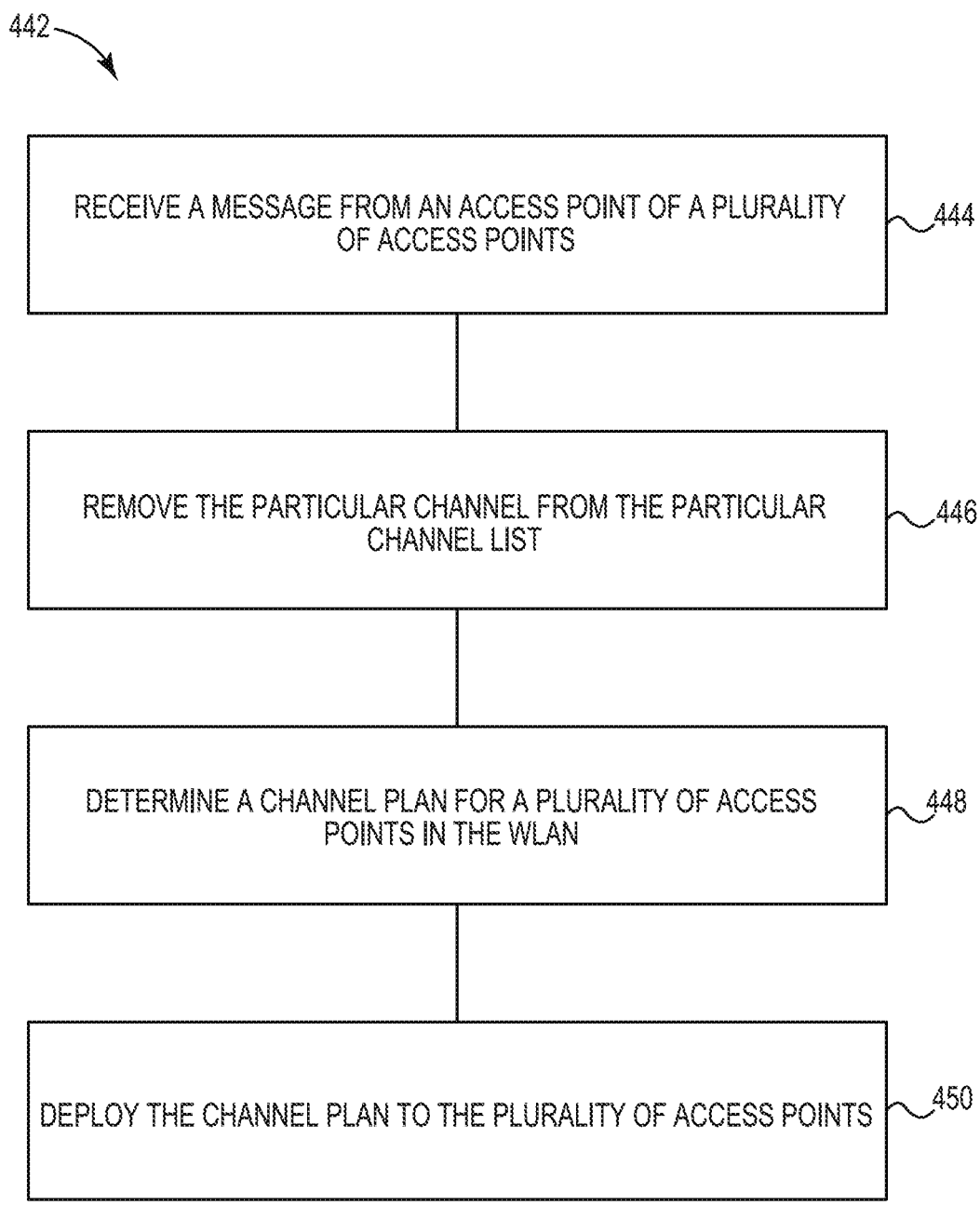
FIG. 4 is an example method for channel plan determination consistent with the present disclosure.

FIG. 4 is an example method 442 for channel plan determination consistent with the present disclosure. At 444, method 442 may include receiving a message from an access point of a plurality of access points. The message may comprise an interference event detected on a particular channel. In some examples, the interference event may correspond to a noise event at the access point. In other examples, the interference event may correspond to a radar event at the access point. The particular channel included in the message may correspond to the channel on which the access point is operating, and may be part of a particular channel list that is associated with the access point. In some examples, the particular channel list may be stored at a network controller, such as network controller 100, described with respect to FIG. 1. The network controller may be a network controller for a plurality of access points in a WLAN, including the access point which experienced the interference event.

At 446, method 442 may include removing the particular channel from the particular channel list associated with the access point. In some examples, the particular channel may be removed from the particular channel list by being marked unavailable. Removing the particular channel from the particular channel list at 446 may further comprise determining that the particular channel list contains at least one additional available channel. Said differently, a determination may be made that the particular channel list includes at least one other channel on which the access point is able to operate that has not been marked unavailable or previously been removed. In response to a determination that the particular channel list includes at least one additional available channel, the particular channel may be removed from the particular channel list at 446.

At 448, method 442 may include determining a channel plan for a plurality of access points in the WLAN. In some examples, determining a channel plan for a plurality of access points in the WLAN at 448 may include determining a channel plan based on a corresponding plurality of channel lists. The corresponding plurality of channel lists may include the particular channel list. In some examples, determining a channel plan for a plurality of access points in the WLAN at 448 may include determining a number of available channels on each of the plurality of channel lists. Each of the plurality of channel lists may be a filtered channel list; that is, each of the plurality of channel lists may be a channel list that has those channels on which interference events occurred removed. Determining a channel plan at 448 may include determining a channel plan that includes the available channels for each of the plurality of access points. Said differently, a channel plan may be determined at 448 to include the channels determined to be available for each of the plurality of channel lists.

At 450, method 442 may include deploying the channel plan to the plurality of access points. In some examples, deploying the channel plan at 450 may include transmitting the channel plan determined at 448 to the plurality of access points. Upon receipt of the channel plan, the access points may begin operating on the operating channels specified in the channel plan. That is, deploying the channel plan at 450 may cause the plurality of access points to switch a channel of operation.

Method 442 may further include determining a number of access points of the plurality of access points to have an interference event. In some examples, the number of access points to have an interference event may be determined by looking at the messages received from the access points, such as the message received at 444. That is, the access points to have experienced at least one interference event may transmit a message indicating an interference event; thus, the number of access points to experience an interference event may correspond to the number of messages received.

Method 442 may further include determining a ratio between the number of access points to have an interference event and a number of access points to not have an interference event. In some examples, the number of access points to not have an interference event may be determined by subtracting the number of access points to have an interference event from a total number of access points. The ratio may then be computed, and may indicate a proportion or percentage of access points to have experienced an interference event.

Method 442 may further include deploying the channel plan to the plurality of access points based on the ratio being above a threshold value. That is, method 442 may include deploying the channel plan, such as at 450, to the plurality of access points when the ratio of access points having an interference events to access points not having an interference event is above a threshold ratio. In some examples, the threshold ratio may correspond to a minimum amount of interference events to occur on the network including the plurality of access points before a new channel plan is to be used. In some examples, if the ratio is not above the threshold ratio, the channel plan may not be deployed. Said differently, the channel plan may be deployed at 450 when the ratio of the number of access points having an interference event to the number of access points not having an interference event is above a threshold ratio, while if the ratio is below the threshold ratio, the channel plan may not be deployed.

In the foregoing detail description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to any number of such elements and/or features.

What is claimed:

1. A system, comprising:
   a memory; and
   a processor executing instructions stored in the memory to:
   determine a number of interference events having occurred on a particular access point of a plurality of access points within a Wireless Local Area Network (WLAN) during a particular time;
   determine a number of channels on which the number of interference events occurred, wherein the number of channels are part of a particular channel list associated with the particular access point, and stored at a network controller;
   filter the particular channel list based on the number of channels determined to have the number of interference events; and
   compute a channel plan for the plurality of access points in the WLAN based on the filtered channel list;
   determine that a number of access points of the plurality of access points experienced at least one interference event during the particular time;
   determine a ratio of access points which experienced at least one interference event during the particular time to access points which did not experience at least one interference event during the particular time; and
   deploy the computed channel plan to the plurality of access points based on the ratio of the access points which experienced at least one interference event to the ration of the access points which did not experience at least one interference event being above a threshold ratio.

2. The system of claim 1, further comprising instructions to:
   filter a channel list for each of the plurality of access points that experienced at least one interference event; and
   compute the channel plan for the plurality of access points based on the filtered channel list.

3. The system of claim 1, further comprising instructions to:
   refrain from deploying the computed channel plan to the plurality of access points based on the ratio of the access points which experienced at least one interference event to the ration of the access points which did not experience at least one interference event being below a threshold ratio.

4. The system of claim 1, wherein the instructions executable to determine the number of interference events having occurred on the particular access point of the plurality of access points within the WLAN during the particular time include instructions executable to:
retrieve a log of interference events, wherein:
the particular access point transmits a message corresponding to an interference event; and
the message is logged as an interference event; and
determine a number of messages logged during the particular time period.

5. The system of claim 1, wherein the instructions executable to filter the particular channel list based on the number of channels determined to have the number of interference events include instructions executable to remove the number of channels determined to have the number of interference events from the particular channel list.

6. The system of claim 1, wherein the instructions executable to compute a channel plan for the plurality of access points in the WLAN based on the filtered channel list include instructions executable to:
determine an available channel for each of the plurality of access points in the WLAN; and
assign each of the plurality of access points in the WLAN to a corresponding available channel.

7. The system of claim 6, further comprising instructions executable to:
determine a number of available channels for each of the plurality of access points in the WLAN;
determine an available channel overlap between at least two of the access points of the plurality of access points; and
assign the at least two of the access points of the plurality of access points non-overlapping channels.

8. A method, comprising:
determining, by a processor, a number of interference events having occurred on a particular access point of a plurality of access points within a Wireless Local Area Network (WLAN) during a particular time;
determining, by the processor, a number of channels on which the number of interference events occurred, wherein the number of channels are part of a particular channel list associated with the particular access point and stored at a network controller;
filtering, by the processor, the particular channel list based on the number of channels determined to have the number of interference events; and
computing, by the processor, a channel plan for the plurality of access points in the WLAN based on the filtered channel list;
determine that a number of access points of the plurality of access points experienced at least one interference event during the periocular time;
determine a ratio of access points which experienced at least one interference event during the particular time to access points which did not experience at least one interference event during the particular time; and
deploy the computed channel plan to the plurality of access points based on the ratio of the access points which experienced at least one interference event to the ration of the access points which did not experience at least one interference event being above a threshold ratio.

9. The method of claim 8, further comprising instructions to:
filter a channel list for each of the plurality of access points that experienced at least one interference event; and
compute the channel plan for the plurality of access points based on the filtered channel list.

10. The method of claim 8, further comprising instructions to:
refrain from deploying the computed channel plan to the plurality of access points based on the ratio of the access points which experienced at least one interference event to the ration of the access points which did not experience at least one interference event being below a threshold ratio.

11. The method of claim 8, wherein the instructions executable to determine the number of interference events having occurred on the particular access point of the plurality of access points within the WLAN during the particular time include instructions executable to:
retrieve a log of interference events, wherein:
the particular access point transmits a message corresponding to an interference event; and
the message is logged as an interference event; and
determine a number of messages logged during the particular time period.

12. The method of claim 8, wherein the instructions executable to filter the particular channel list based on the number of channels determined to have the number of interference events include instructions executable to remove the number of channels determined to have the number of interference events from the particular channel list.

13. The method of claim 8, wherein the instructions executable to compute a channel plan for the plurality of access points in the WLAN based on the filtered channel list include instructions executable to:
determine an available channel for each of the plurality of access points in the WLAN; and
assign each of the plurality of access points in the WLAN to a corresponding available channel.

14. The method of claim 13, further comprising instructions executable to:
determine a number of available channels for each of the plurality of access points in the WLAN;
determine an available channel overlap between at least two of the access points of the plurality of access points; and
assign the at least two of the access points of the plurality of access points non-overlapping channels.

15. A non-transitory computer readable storage medium comprising instructions which, when executed by a processor, cause the processor to:
determine a number of interference events having occurred on a particular access point of a plurality of access points within a Wireless Local Area Network (WLAN) during a particular time;
determine a number of channels on which the number of interference events occurred, wherein the number of channels are part of a particular channel list associated with the particular access point and stored at a network controller;
filter the particular channel list based on the number of channels determined to have the number of interference events; and
compute a channel plan for the plurality of access points in the WLAN based on the filtered channel list;

determine that a number of access points of the plurality of access points experienced at least one interference event during the periocular time;

determine a ratio of access points which experienced at least one interference event during the particular time to access points which did not experience at least one interference event during the particular time; and deploy the computed channel plan to the plurality of access points based on the ratio of the access points which experienced at least one interference event to the ration of the access points which did not experience at least one interference event being above a threshold ratio.

16. The non-transitory computer readable storage medium of claim 15, further comprising instructions to:

filter a channel list for each of the plurality of access points that experienced at least one interference event; and compute the channel plan for the plurality of access points based on the filtered channel list.

17. The non-transitory computer readable storage medium of claim 15, further comprising instructions to:

refrain from deploying the computed channel plan to the plurality of access points based on the ratio of the access points which experienced at least one interference event to the ration of the access points which did not experience at least one interference event being below a threshold ratio.

\* \* \* \* \*